(12) United States Patent
Zhang et al.

(10) Patent No.: US 9,160,740 B2
(45) Date of Patent: Oct. 13, 2015

(54) ESTABLISHING SECURE, MUTUALLY AUTHENTICATED COMMUNICATION CREDENTIALS

(71) Applicant: Microsoft Corporation, Redmond, WA (US)

(72) Inventors: Hao Zhang, Sammamish, WA (US); Jeffrey B. Kay, Bellevue, WA (US); Malcolm E. Pearson, Kirkland, WA (US); Eric D. Tribble, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 14/017,481

(22) Filed: Sep. 4, 2013

(65) Prior Publication Data

US 2014/0006783 A1 Jan. 2, 2014

Related U.S. Application Data

(63) Continuation of application No. 11/421,341, filed on May 31, 2006, now Pat. No. 8,549,295.

(51) Int. Cl.
*H04L 29/00* (2006.01)
*H04L 29/06* (2006.01)
*H04L 9/32* (2006.01)

(52) U.S. Cl.
CPC ............ *H04L 63/083* (2013.01); *H04L 9/3226* (2013.01); *H04L 9/3263* (2013.01); *H04L 9/3273* (2013.01); *H04L 63/0428* (2013.01); *H04L 63/0869* (2013.01); *H04L 63/166* (2013.01); *H04L 2463/081* (2013.01)

(58) Field of Classification Search
None
See application file for complete search history.

(56) References Cited

U.S. PATENT DOCUMENTS

| | | | |
|---|---|---|---|
| 5,418,854 | A | 5/1995 | Kaufman et al. |
| 5,737,419 | A | 4/1998 | Ganesan |
| 6,510,464 | B1 | 1/2003 | Grantges, Jr. et al. |
| 6,598,167 | B2 | 7/2003 | Devine et al. |
| 6,606,663 | B1 | 8/2003 | Liao et al. |
| 6,678,828 | B1 | 1/2004 | Zhang et al. |

(Continued)

FOREIGN PATENT DOCUMENTS

| | | |
|---|---|---|
| CA | 2390817 A1 | 12/2003 |
| EP | 1143665 B1 | 1/2007 |
| WO | 00/07355 | 2/2000 |

OTHER PUBLICATIONS

Sun Microsystems, Chapter 5 Deployment Design, Online, Feb. 2005, Retrieved Jul. 2009, http://web.archive.org/web20050219003745/http://docs.sun.com/source/819-0058/dep_archetect.html, pp. 1-22.

(Continued)

*Primary Examiner* — Jeffrey Pwu
*Assistant Examiner* — Helai Salehi
(74) *Attorney, Agent, or Firm* — Louise Bowman; David Andrews; Micky Minhas

(57) ABSTRACT

Establishing secure, mutually authenticated communication between a trusted network and a perimeter network. Servers on the perimeter network may be securely and automatically configured to communicate with the trusted network. Servers not functioning properly may be stopped from communicating with the other servers. Credential information relating to a perimeter server may be automatically, and regularly, updated without intervention.

20 Claims, 4 Drawing Sheets

(56) References Cited

U.S. PATENT DOCUMENTS

| | | |
|---|---|---|
| 6,732,277 B1 | 5/2004 | Vandergeest et al. |
| 6,816,970 B2 | 11/2004 | Morgan et al. |
| 6,931,532 B1 | 8/2005 | Davis et al. |
| 6,941,459 B1 | 9/2005 | Hind et al. |
| 6,961,849 B1 | 11/2005 | Davis et al. |
| 6,978,367 B1 | 12/2005 | Hind et al. |
| 7,003,562 B2 | 2/2006 | Mayer |
| 7,051,064 B1 | 5/2006 | Yamagishi et al. |
| 7,181,017 B1 | 2/2007 | Nagel et al. |
| 7,240,202 B1 | 7/2007 | Orman |
| 7,340,438 B2 | 3/2008 | Nordman et al. |
| 7,496,628 B2 | 2/2009 | Arnold et al. |
| 7,522,908 B2 | 4/2009 | Hrastar |
| 7,587,366 B2 | 9/2009 | Grim, III et al. |
| 7,613,659 B1 | 11/2009 | Hoffman et al. |
| 2002/0048369 A1 | 4/2002 | Ginter et al. |
| 2002/0078351 A1 | 6/2002 | Garib |
| 2002/0099823 A1 | 7/2002 | Jemes et al. |
| 2002/0178230 A1 | 11/2002 | Aggarwal et al. |
| 2003/0014629 A1 | 1/2003 | Zuccherato |
| 2003/0050911 A1 | 3/2003 | Lucovsky et al. |
| 2003/0069950 A1 | 4/2003 | Gieseke |
| 2003/0149888 A1 | 8/2003 | Yadav |
| 2004/0049697 A1 | 3/2004 | Edwards, Jr. et al. |
| 2004/0117667 A1 | 6/2004 | Lavender et al. |
| 2004/0162880 A1 | 8/2004 | Arnone et al. |
| 2004/0260778 A1 | 12/2004 | Banister et al. |
| 2005/0055578 A1 | 3/2005 | Wright et al. |
| 2005/0216587 A1 | 9/2005 | John |
| 2006/0031929 A1 | 2/2006 | Saito |
| 2006/0041761 A1 | 2/2006 | Neumann et al. |
| 2006/0047792 A1 | 3/2006 | Dharmarajan et al. |
| 2006/0294366 A1 | 12/2006 | Nadalin et al. |
| 2007/0100701 A1 | 5/2007 | Boccon-Gibod et al. |
| 2007/0177731 A1 | 8/2007 | Spies et al. |
| 2007/0234055 A1 | 10/2007 | Ohara et al. |
| 2008/0060080 A1 | 3/2008 | Lim |

OTHER PUBLICATIONS

Cuervo, F. et al., "Prime Time for Policy-Based Management", Alcatel Telecommunications Review, Alcatel, Paris Cedex, FR, Jul. 2003, XP007005947, ISSN: 1267-7167, 9 pgs.

Microsoft Corporation, Active Directory in Networks Segmented by Firewalls, Microsoft Windows 2000 Server, http://www.intellectualconceptsinc.com/library/Segmented%20AD.pdf, Jul. 2002, 34 pp., Microsoft Corporation, United States.

Techworld, Building a Security DMZ, http://www.techworld.com/security/features/index.cfm?featureid=322, Feb. 4, 2004, 7 pp.

Lowther, Brandon, Securing an Infrastructure with Windows 2000 and Active Directory http://www.giac.org/certified_professionals/practicals/gcwn/0236.php, Apr. 8, 2002, 41 pp., SANS Institute 2003.

St. Bernard Software, ePrism Installation Guide, http://www.stbernard.com/products/docs/ig/ep/ePrism_Enterprise_5.0_Install_Guide.pdf, May 24, 2005, 38 pp., United Kingdom.

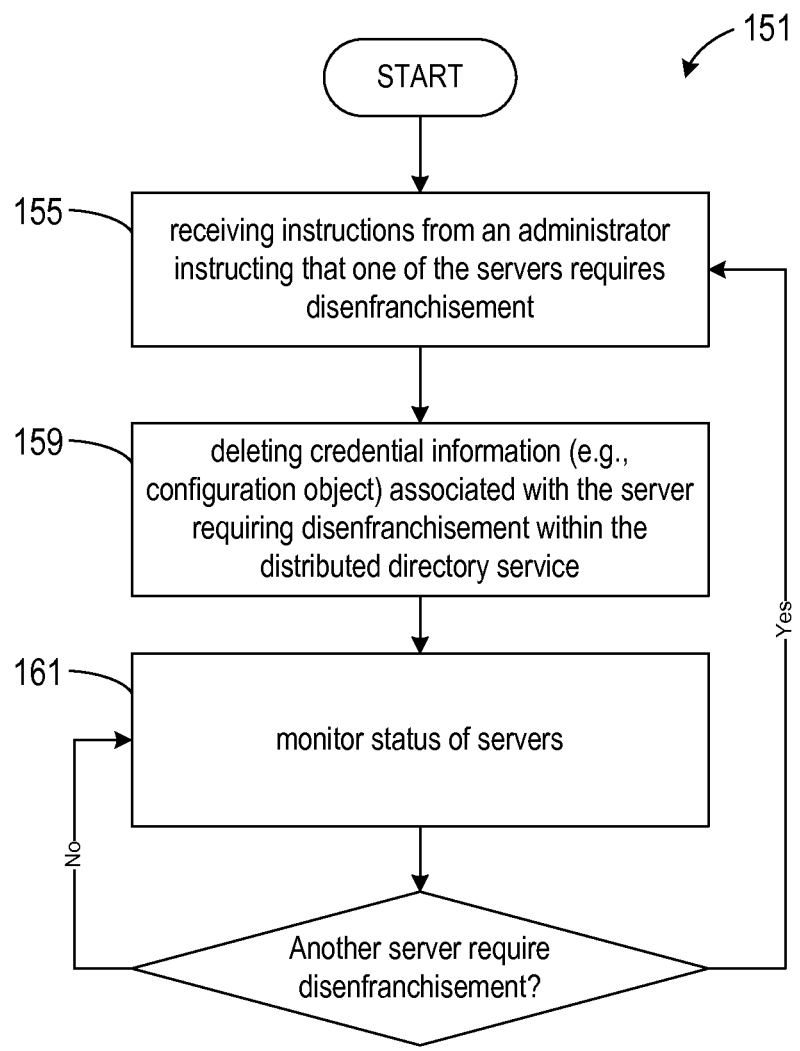

ESTABLISHING SECURE, MUTUALLY AUTHENTICATED COMMUNICATION CREDENTIALS

REFERENCE TO RELATED APPLICATIONS

This present application is a continuation of U.S. application Ser. No. 11/421,341, filed May 31, 2006, the entire disclosure of which is incorporated herein by reference for all purposes.

Large networks are often organized to enhance security from outside attack. A common architecture for such a network includes a perimeter network, or DMZ (i.e., demilitarized zone), that surrounds a trusted network and acts as a buffer between the trusted network and the broader (e.g., global) computing network. These perimeter networks are utilized as a first line of defense against attack from entities residing in the broader network. As a first line of defense, devices and data stored upon the perimeter network are assumed to be at greater risk of attack. Thus, network designers carefully consider what data is placed on devices residing in such perimeter networks. For example, a common task for servers placed on a perimeter network is the routing of e-mails to users within the trusted network. To perform such routing functions, these servers need some information related to the users on the trusted network. Such data is readily available on the trusted network, such as through a distributed directory service containing configuration information (e.g., Microsoft Windows® Active Directory for Windows Server 2003). But because of the increased vulnerability of the perimeter network servers to attack, it is advantageous to limit the quantity and type of data replicated from the distributed directory service on the trusted network and placed upon the perimeter network servers. For the e-mail routing example, e-mail addresses may be stored on servers in the perimeter network, while other information about users is stored on the distributed directory service of the trusted network.

In addition to limiting the amount and type of information placed upon the perimeter network servers, the communication link between the perimeter network and the trusted network must be secure. In particular, establishing a secure communication link means establishing a mutually authenticated, authorized, and encrypted communication channel (e.g., an LDAP (Lightweight Directory Access Protocol) communication channel, among others) between the trusted network and the perimeter network. For this purpose, particular credentials can be created, whose password remains secure, to provide for secure communication between the trusted network and the perimeter network. Moreover, servers running in a conventional perimeter network must be individually, manually configured. A method for commonly configuring servers in the perimeter network once via the distributed directory service and replicating the configuration securely to the perimeter network would be beneficial.

Updating such credentials periodically can also be cumbersome conventionally. New passwords must be generated and utilized before current passwords expire. The coordination of such credential updates can be time-consuming, for example, if performed manually. A method for automatically updating such credentials before their expiration would be beneficial.

In addition to providing communication between the trusted network and the perimeter network, some situations require the removal of a particular server from communicating with other servers, such as to protect the other servers from a problem with the removed server, such as removal of a server that has potentially been compromised. A system allowing such removal of a suspect server in a rapid fashion, without requiring physical and/or manual access to the server in question, so that other servers are protected from the potentially compromised server, would be beneficial. The more quickly such a server can be removed from communication with other servers, the more likely the ill effects attributable to the server can be avoided.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, aspects of embodiments of the invention provide for establishing secure, mutually authenticated communication between a trusted network and a perimeter network. By establishing secure communication, aspects of embodiments of the invention permit automatic configuration of servers on the perimeter network. Moreover, by providing a means for limiting the communication with a particular server, aspects of embodiments of the invention can isolate servers not functioning properly, such as those having compromised security. In addition, by providing a method for automatically updating credential information, aspects of embodiments of the invention can automatically sustain communication while updating credential information changes without manual intervention.

BRIEF DESCRIPTION OF THE DRAWINGS

FIG. 4 is a flow diagram of still another method of still another embodiment of the invention.

Corresponding reference characters indicate corresponding parts throughout the drawings.

DETAILED DESCRIPTION

Figure 1:
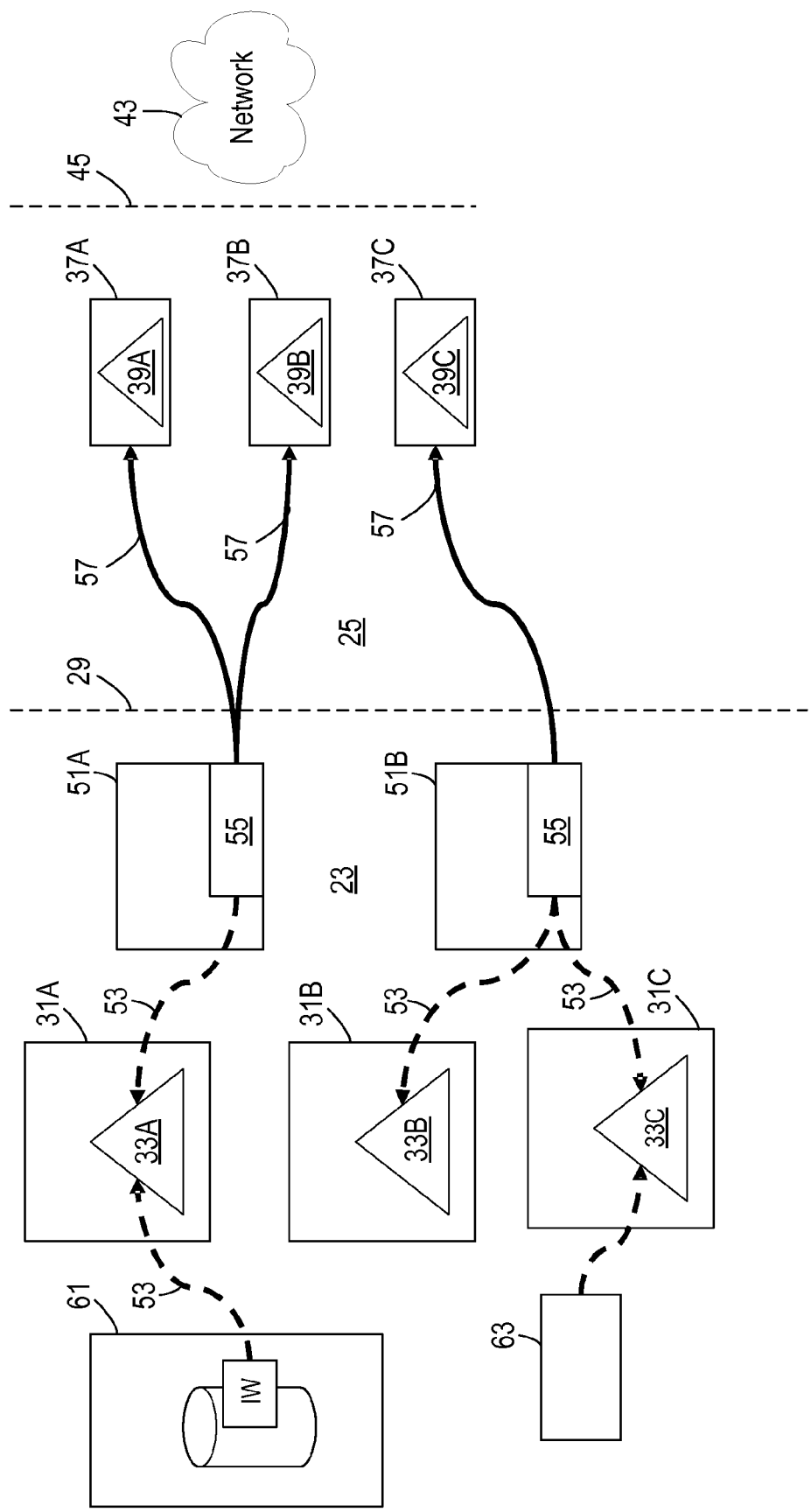
FIG. 1 is a diagram of a system of one embodiment of the invention.

Referring now to FIG. 1, a system, generally indicated 21, for establishing secure, mutually authenticated communication between a trusted network 23 and a perimeter network 25 outside the trusted network. In particular, as discussed in greater detail below with respect to exemplary methods of the present invention, aspects of the embodied invention transfer a public key and a bootstrap password from the perimeter network 25 to the trusted network 23 for authenticating communication between the two. The trusted network 23 exists, for example, behind an interior firewall 29 separating the perimeter network 25 and the trusted network 23. In one exemplary embodiment, the trusted network 23 is a corporate network, and the perimeter network 25 is a DMZ protecting the corporate network.

The system 21 comprises one or more master servers 31, or domain controllers, residing in the trusted network 23. In the example of FIG. 1, three master servers, a first master server 31A, a second master server 31B, and a third master server 31C, are each adapted for administering a distributed directory service 33 containing configuration information related to the trusted network 23. As used herein, for example, the configuration information can include system configuration data, recipient data, and/or routing data, among others. Each of the master servers 31A, 31B, and 31C is adapted for administering a first copy of the distributed directory service 33A, a second copy of the distributed directory service 33B, and a third copy of the distributed directory service 33C, respectively. Each distributed directory service 33A, 33B, and 33C contains the same configuration information related to the trusted network 23. In one example, the distributed directory service 33 is Microsoft Windows® Active Directory for Windows Server 2003, although the master servers may administer other alternative distributed directory services without departing from the scope of embodiments of the invention. When administering such a distributed directory service 33 on a trusted network 23, an administrator accessing any of the master servers 31 may add to, delete from, or modify the configuration information stored on the accessed master server. The distributed directory service 33 is responsible for updating the configuration information on the other master servers 31 according to the additions, deletions, or modifications resulting from the actions of the administrator.

The system 21 also comprises one or more edge servers 37 residing in the perimeter network 25 outside the trusted network 23. In the example of FIG. 1, three edge servers, a first edge server 37A, a second edge server 37B, and a third edge server 37C, are each adapted for administering a stand-alone directory service 39. Each of the edge servers 31A, 31B, and 31B is adapted for administering a first copy of the stand-alone directory service 39A, a second copy of the stand-alone directory service 39B, and a third copy of the stand-alone directory service 39C, respectively. In one example, the stand-alone directory service 93 is Microsoft Active Directory Application Mode for Windows Server 2003, although the edge servers may administer other alternative stand-alone directory services without departing from the scope of embodiments of the invention. The one or more edge servers 37 are adapted for communicating with a network 43 (e.g., the Internet) outside the perimeter network 25. In the example shown, an exterior firewall 45 separates the one or more edge servers 37 residing in the perimeter network 25 from the network 43 outside the perimeter network. Any of a variety of alternative firewall applications and other additional or alternative security measures may be utilized without departing from the scope of the embodiments of the invention.

The system 21 further comprises one or more edge-connected bridgehead servers 51 residing in the trusted network 23 and adapted for communicating with the one or more master servers 31. The edge-connected bridgehead servers 51 communicate with the master servers 31 to obtain configuration information stored in the distributed directory service 33. In the example shown, the edge-connected bridgehead servers 51 utilize trusted network 23 secured LDAP 53 to communicate with the master servers 31, although other alternative protocols may be utilized without departing from the scope of embodiments of the invention. In the example shown, a first edge-connected bridgehead server 51A communicates with the first master server 31A, while the second edge-connected bridgehead server 51B communicates with the second master server 31B and the third master server 31C. As would be readily understood by one skilled in the art, an edge-connected bridgehead server 51 can communicate with one or more master servers 31 separately or in combination without departing from the scope of embodiments of the invention. Moreover, one skilled in the art will also recognize that one or more master servers 31 in the trusted network 23 may be assigned to function as bridgehead servers 51.

The edge-connected bridgehead servers 51 are adapted for replicating the configuration information from the distributed directory service 33 administered by the one or more master servers 31 within the trusted network 23 to the stand-alone directory service 39 administered by the one or more edge servers 37 within the perimeter network 25. The configuration information is replicated from the edge-connected bridgehead servers 51 to the edge servers 37 using internal firewall 29 secured LDAP 57, although other protocols may be utilized without departing from the scope of embodiments of the invention.

In one example, the edge-connected bridgehead servers 51 execute a replication application 55 for performing such replication of configuration information to the stand-alone directory service 39 administered by the one or more edge servers 37. The replication application 55 can perform several functions, including (i) scheduling the interaction between the distributed directory service 33 on the master server 31 and the stand-alone directory service 39 on the edge server, (ii) replication of configuration information to the perimeter network 25 via LDAP, (iii) determining the topology of the components of the system 21, (iv) locking particular edge servers 37 from use, among others. Other alternative functions may also be performed without departing from the scope of embodiments of the invention. Moreover, in the example shown, the first edge-connected bridgehead server 51A communicates with both the first edge server 37A and the second edge server 37B, while the second edge-connected bridgehead server 51B communicates with the third edge server 37C. As would be readily understood by one skilled in the art, an edge-connected bridgehead server 51 can communicate with one or more edge servers 37 without departing from the scope of embodiments of the invention. Other alternative configurations are also contemplated.

The system 21 may also comprise other components. For example, the system 21 depicted in FIG. 1 includes an exemplary client mailbox 61 for use by an information worker (IW) communicating with one of the master servers 31 via trusted network 23 secured LDAP 53. In addition, the system 21 includes a bridgehead server 63 communicating with a master server 31, but not functioning as an edge-connected bridgehead server. Other alternative components may be utilized without departing from the scope of embodiments of the invention.

Figure 2:
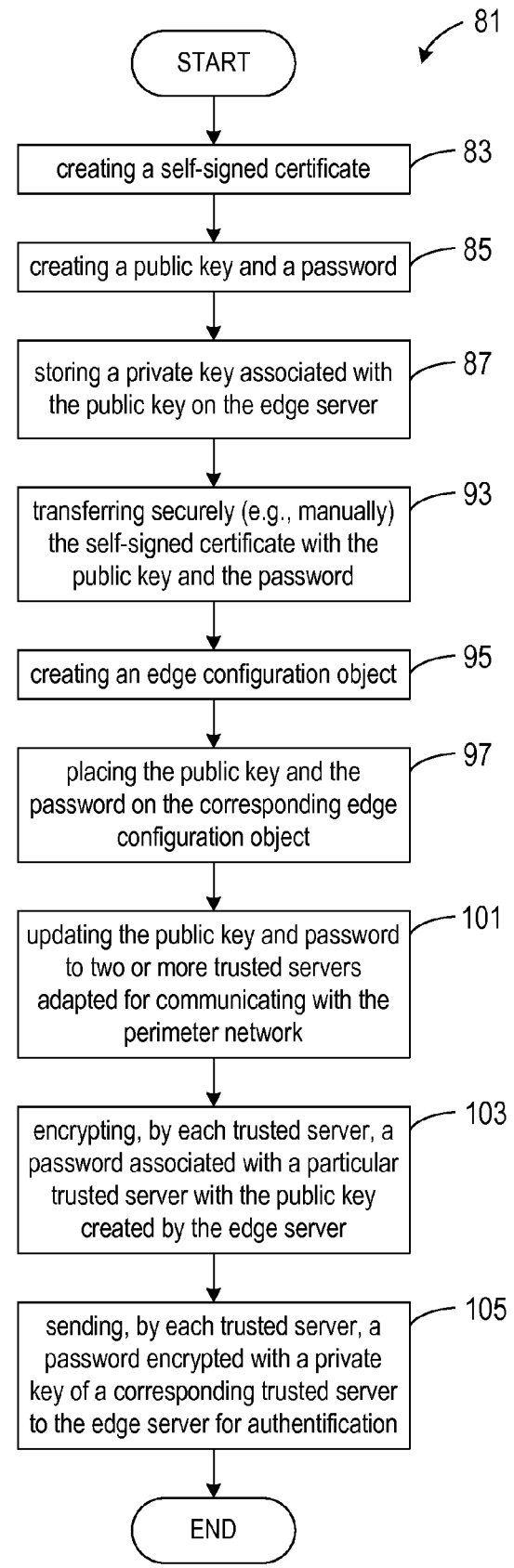
FIG. 2 is a flow diagram of a method of one embodiment of the invention.

An exemplary flow diagram, generally indicated at 81 in FIG. 2, illustrates aspects of a method for establishing secure, mutually authenticated communication between trusted servers 51 (e.g., an edge-connected bridgehead server) of a trusted network 23 and an edge server 37 of a perimeter network 25 outside the trusted network. Beginning at 83, aspects of the embodied invention create a self-signed certificate for secure SSL (secure sockets layer) connection on the edge server 37 in the perimeter network 25. Such a secure SSL connection may be utilized throughout the present method 81. As would be readily understood by one skilled in the art, the self-signed certificate may be of another security and privacy protocol without departing from the scope of the aspects of the embodied invention.

Proceeding to 85, aspects of the embodied invention create a public key, a private key, and a password associated with the edge server 37 in the perimeter network 25 with the certificate. In one example, the public key, the private key, and the password are created as part of the certificate. Moreover, in another example, the method provides different security levels for different types of data that require independent protection. For example, one or more other public/private key combinations not associated with the certificate, or any certificate, may be utilized to provide different security levels for other data.

Aspects of the embodied invention further store, at 87, a private key associated with the public key on the edge server 37 in the perimeter network 25. As would be readily understood by one skilled in the art, the edge server 37 may provide its public key to other entities (e.g., servers), such that those entities can use its public key to encrypt data that only the edge server 37 can decrypt with its private key.

At 93, aspects of the embodied invention transfer securely the self-signed certificate with the public key and the password (e.g., a bootstrap password) from the edge server 37 of the perimeter network 25 to the distributed directory service 33 of the trusted network 23. In one exemplary embodiment, the transferring securely comprises transferring manually, also at 93, the self-signed certificate with the public key and the password to the trusted network 23. As used herein, the term "manually" means human-directed, as compared with automatically directed, such as by a computer application. An example of such a manual transfer, may include hand-carrying a memory storage device, such as a USB drive or floppy disc from a machine operating in the perimeter network 25 to a machine operating in the trusted network 23. Further aspects of the embodied invention maintain, also at 93, the self-signed certificate with the public key and the password in a secure state during the manual transfer. For example, the public key and password may be pin-protected on the memory storage device for further protection in the event of loss of physical control of the memory storage device. In another exemplary embodiment, the transferring securely 93 further comprises transferring securely a location identifier associated with the edge server. In still another exemplary embodiment, a secure, direct electronic transfer mechanism may be utilized for securely transferring the self-signed certificate with the public key and the password.

Within the trusted network 23, aspects of the embodied invention further create, at 95, an edge configuration object associated with the edge server 37 on the distributed directory service 33 administered within the trusted network. In one example, the edge configuration object is created immediately after the secure transfer 93 of the public key and the password, so that this data is available to create the correct object in the distributed directory service 33. The edge configuration object resides on each of the master servers 31 administering the distributed directory service 33. This edge configuration object can retain configuration information related to the edge server 37. Although the present explanation of exemplary method 81 utilizes a single edge server 37, additional edge servers may also be included. Each such additional edge server 37 will include a corresponding edge configuration object on each master server 31 administering the distributed directory service 33.

The operations continue by placing, at 97, the public key and the password on the corresponding edge configuration object. For example, the edge configuration object may reside on one of the trusted servers 31 (e.g., a master server) administering the distributed directory service 33 within the trusted network 23. In a more specific example, such placing 97 may be accomplished by a system administrator by storing the public key and the password on the edge configuration object of the distributed directory service 33. Once the public key and password are within the trusted network, the distributed directory service 33 updates, at 101, the public key and password associated with the edge server to two or more of the trusted servers 51 adapted for communicating with the perimeter network 25 (e.g., edge-connected bridgehead servers), thereby identifying the edge server 37 to each of the trusted servers as a registered edge server. Once the public key and password are placed 97 upon the corresponding edge configuration object, the public key and password information initially stored during the secure transfer 93, such as on the memory storage device, should be destroyed to minimize the risk of an unsecured release of such information.

Now that each of the trusted servers 51 adapted for communicating with the perimeter network 25 has received the public key and password of the edge server 37, each such trusted server further encrypts, at 103, its own particular password with the public key created by the edge server. This encryption ensures that only the edge server 37 holding the private key associated with the public key can decrypt the particular password associated with and generated by the trusted server 51. In one example, authenticity may be further secured by each of the trusted servers 51 digitally signing the encrypted credential information, thereby authenticating it. Proceeding to 105, aspects of the embodied invention send, by each trusted server 51, a password associated with each particular trusted server encrypted with a private key associated with the particular trusted server to the edge server 37 for authenticating the edge server with respect to each trusted server. The public key corresponding to the private key of each trusted server 51 is already available at the edge servers 37 for decrypting the encrypted passwords of each of the trusted servers. In one exemplary embodiment, the sending comprises sending, also at 105, through the secure SSL established by the self-signed certificate. As would be readily understood by one skilled in the art, other protocols, such as an HTTP/XML (hypertext transfer protocol/extensible markup language) based protocol, may be utilized without departing from the scope of the present invention. In another exemplary embodiment, the sending 105 the encrypted password comprises sending the encrypted password to a stand-alone directory service administered by the edge server 37 being authenticated.

Figure 3:
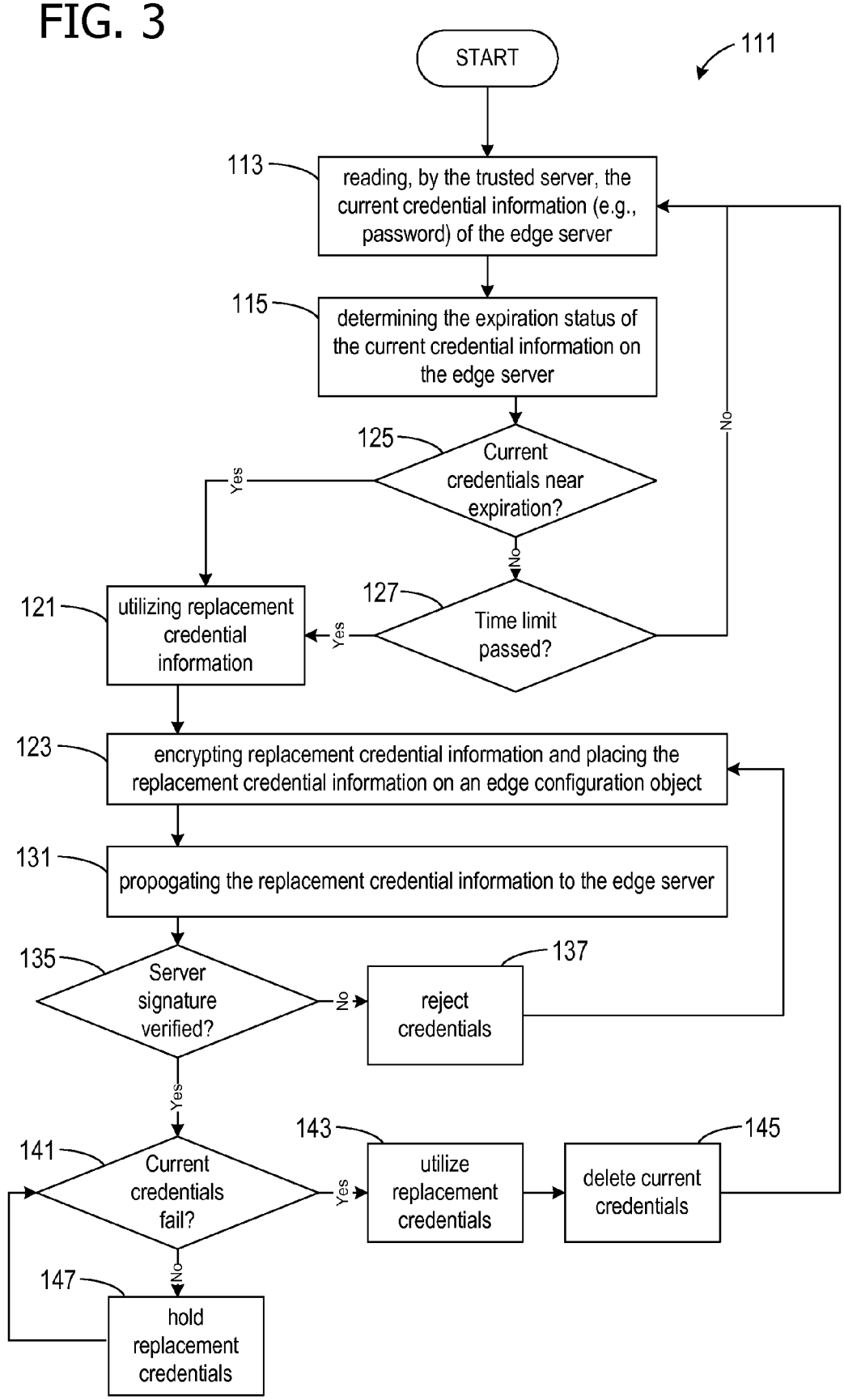
FIG. 3 is a flow diagram of another method of another embodiment of the invention.

Another exemplary flow diagram, generally indicated at 111 in FIG. 3, illustrates aspects of a method for automatically updating credential information between a trusted server 51 residing on a trusted network 23 and an edge server 37 residing on a perimeter network 25. Beginning at 113, aspects of the embodied invention read, by the trusted server 51, the current credential information of the edge server 37 residing on the perimeter network 25. Proceeding to 115, aspects of the embodied invention determine the expiration status of the current credential information on the edge server. For example, the credential information may include an expiration time indicating the time at which the credential information expires.

Generally speaking aspects of the embodied invention further create, at 121, replacement credential information when a replacement criterion is met. In one embodiment, the creating 121 replacement credential information occurs when at least one of the following replacement criteria is met: (i) the current credential information is near expiration and (ii) a time limit has passed. In the exemplary flow diagram of FIG. 3, decision element 125 determines if the current credentials are near expiration, and decision element 127 determines if a time limit has passed. An affirmative answer to either of these decision elements 125, 127 invokes creation 121 of replacement credential information. Alternately, a negative answer to both of these decision elements 125, 127 invokes a return to the reading 113 operation discussed above.

For example, an appropriate time limit may be utilized to ensure that the password is updated properly. Where the password must be updated every 60 days, the time limit for creating a new password may be set to 55 days. In this manner, a replacement password is created at day 55 in the life of a 60 day password, so that the first password is never allowed to expire. In an alternate example, the expiration date of the current credential information may be utilized as a trigger. For example, when the expiration date of the current credential information is within the next seven days, the method creates a replacement password. In this manner, the replacement credential information is created and utilized before the current credential information is allowed to expire. Other triggers for replacement of the credential information may be utilized without departing from the scope of the embodied invention. In another example, two sets of credential information are initially created, and only a first set is immediately utilized, while the other is maintained for later use. Once the first set of credential information expires and/or fails to function, the second set of maintained credential information is readily available as replacement credential information. The first set of expired credential information is then updated for use again and maintained for when the second set expires and/or fails to function. This process is repeated, whereby the replacement credential information is created immediately after expiration and/or failure of the previous credential information, such that an extra set of credential information is available.

In one example, the creating 121 replacement credential information comprises encrypting, at 123, the replacement credential information for the edge server 37 and placing, also at 23, the replacement credential information on an edge configuration object associated with the edge server. In one example, the distributed directory service 33 provides the edge configuration object. In another exemplary embodiment, the replacement credential information may be otherwise delivered to the edge server 37 securely.

In another further example the credential information comprises a password, whereby the reading 113 discussed above comprises reading a password of the edge server 37. Similarly, the encrypting 123 discussed above comprises encrypting a replacement password. In still further password examples, the encrypting 123 a replacement password comprises encrypting a replacement password including non-ASCII characters. Including non-ASCII characters in a password makes the password more unique, because more characters are available. Alternatively, the encrypting 123 a replacement password can further comprise encrypting a replacement password created automatically by a random number generator. This ensures that the password is unique and does not include any unintentional pattern, as may be the case with human-defined passwords. In still another example, the encrypting 123 a replacement password can comprise encrypting a replacement password including a maximum number of allowable characters. For example, the maximum number of allowable characters may be limited by the operating system executed by servers on the trusted and perimeter networks 23, 25. Allowing encryption of a password as long as permitted by the operating system, the password's uniqueness is further enhanced. Other password enhancements may also be utilized without departing from the scope of embodiments of the embodied invention.

At 131, aspects of the embodied invention propagate the replacement credential information from the distributed directory service 33 to the edge server 37 by any trusted server 51. In other words, any of the edge-connected bridgehead servers 51 may propagate the replacement credential information to the edge server 37. In one example, the propagating 131 the replacement credential information occurs with any trusted server 51 adapted for communication with the perimeter network 25. In one example, authenticity may be further secured if each of the trusted servers 51 digitally signs the credential information, thereby authenticating the credential information. Once propagated, aspects of the embodied invention may further comprise verifying 135, at the edge server 37, that the appropriate trusted server 51 has signed the credentials. This verification 135 ensures that one trusted server 51 has not signed credentials for another trusted server. Where the wrong trusted server 51 has signed the credentials, the replacement credentials are rejected, at 137, and the method 111 returns to repeat the reading operation 113.

Where the correct trusted server 51 has signed the credentials, the method continues. At this point, both the current credentials and the replacement credentials exist on the trusted server 51, and the trusted server continues to the utilized the current credentials to communication with the edge server 37. At some point, however, the current credentials will fail to work. Proceeding to 141, a decision element determines if the current credentials fail to work. When an attempt to utilize the current credential information fails, aspects of the embodied invention further utilize, at 143, by the trusted server 51, the replacement credential information. Aspects of the embodied invention further delete, at 145, the current credential information when the attempt to utilize the replacement credential information is successful. The method 111 then returns to the reading 113 operation discussed above, to restart the process with the replacement credential information. Alternately, when an attempt to utilize the current credential information is successful, aspects of the embodied invention further hold, at 147, the replacement credentials and continue using the current credentials until they fail, as described above.

By this method 111, the trusted server 51 can continually review and revise the password associated with the edge server 37. By this method 111, the password may be continually changed, thereby enhancing security, without the added work of manually changing the password periodically.

Still another exemplary flow diagram, generally indicated at 151 in FIG. 4, illustrates aspects of a method for disenfranchising a server residing on a trusted network 23 or a perimeter network 25 from communication with other servers on the trusted network or the perimeter network. As above, the trusted network 23 administers a distributed directory service 33 comprising credential information corresponding to each of the servers on the trusted network 23 and the perimeter network 25. As used herein, the term "disenfranchisement" refers to prohibiting a server from communicating with other servers by removing its ability to authenticate communications with other servers.

Beginning at 155, aspects of the embodied invention receive instructions from an administrator from within the trusted network 23 instructing that one of the servers requires disenfranchisement from communicating with the other servers. The disenfranchisement of a particular server may occur for a variety of reasons. In one example, the receiving instructions 155 comprises receiving an indication that the server requiring disenfranchisement poses a security risk. In this example, a ready means for disenfranchising a server that poses a security risk, without having to physically act upon the server, is useful. For example, a server may be disenfranchised remotely. Also, where the server is a security risk because of an application has taken control over the server, the server itself may be difficult to control. But the present method provides for an external means for simply stopping other, readily controllable servers from communicating with the server at risk. In this manner, the server is cut off without requiring any control over the actual server itself. In another example, the server may need to be removed from the system momentarily for service, or for some other reason unrelated to security, without departing from the scope of embodiments of the present invention.

Proceeding to 159, aspects of the embodied invention delete credential information associated with the server requiring disenfranchisement within the distributed directory service 33. This eliminates the ability of any server on the trusted network 23 or the perimeter network 25 to establish communication with the server with deleted credential information. As noted above, this deletion 159 of the credential information essentially makes the disenfranchised server invisible to the other servers, whereby no server can communicate with the disenfranchised server. In another embodiment, the deleting 159 credential information associated with a server comprises deleting a configuration object associated with the server on the distributed directory service 33 administered by the trusted network 23.

Continuing with 161, the method further monitors the status of the servers for to determine if another server requires disenfranchisement. Monitoring 161 continues if no further servers require disenfranchisement. The method 151 returns to the receiving 155 if another server requires disenfranchisement.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for automatically updating credential information between a trusted server residing on a trusted network and an edge server residing on a perimeter network outside the trusted network, at least one server in the trusted network administering a distributed directory service, said method comprising:
    reading, by the trusted server, current credential information associated with the edge server residing on the perimeter network outside the trusted network, wherein the credential information includes a public key created by the edge server and a password created by the edge server, said public key and said password being associated with the edge server;
    determining, by the trusted server, an expiration status of the current credential information associated with the edge server;
    storing replacement credential information in an edge configuration object in the distributed directory service when a replacement criteria is met, said replacement credential information including a replacement password created by and associated with the edge server, said replacement password being encrypted;
    propagating, by any trusted server in the trusted network, the replacement credential information stored in the edge configuration object from the distributed directory service to the edge server in the perimeter network, wherein said trusted server secures the authenticity of the replacement credential information by digitally signing the credential information with a private key created by and associated with said trusted server;
    verifying, at the edge server, that the replacement credential information received from the propagating trusted server has been digitally signed by said propagating trusted server, whereby the replacement credential information is rejected when said verifying fails; and
    utilizing, by the trusted server, the replacement credential information when an attempt to utilize the current credential information fails.

2. A method as set forth in claim 1 further comprising deleting the current credential information when an attempt to utilize the replacement credential information is successful.

3. A method as set forth in claim 1 wherein said storing replacement credential information comprises digitally signing, by each trusted server, the credential information of the particular trusted server with a private key created by the trusted server, said method further comprising verifying, at the edge server, that each particular trusted server has digitally signed its respective credentials.

4. A method as set forth in claim 1 wherein said propagating the replacement credential information occurs with any trusted server adapted for communication with the perimeter network.

5. A method as set forth in claim 1 further comprising:
    disenfranchising a server computing device residing on the trusted network or the perimeter network from communication with other server computing devices on the trusted network or the perimeter network, said distributing directory service comprising credential information corresponding to each of the server computing devices on the trusted network and the perimeter network, said method comprising:
    receiving instructions at the one or more domain controller computing devices from an administrator from within the trusted network instructing that one of the server computing devices requires disenfranchisement from communicating with the other server computing devices, wherein said receiving instructions includes receiving an indication that the server computing device requiring disenfranchisement poses a security risk; and
    deleting credential information associated with the server computing device requiring disenfranchisement within the distributed directory service on the one or more domain controller computing devices based on the received instructions, wherein said deleting comprises deleting a configuration object associated with the server computing device within the distributed directory service, thereby eliminating the ability of any server computing device on the trusted network or the perimeter network to establish communication with the server with deleted credential information.

6. A method as set forth in claim 1 wherein the instructions are stored on one or more computer-readable memory devices.

7. A method as set forth in claim 2 wherein said reading the current credential information comprises reading a password of the edge server; and
    wherein said encrypting the replacement credential information comprises encrypting a replacement password.

8. A method as set forth in claim 4 further comprising:
disenfranchising a server computing device residing on the trusted network or the perimeter network from communication with other server computing devices on the trusted network or the perimeter network, said distributing directory service comprising credential information corresponding to each of the server computing devices on the trusted network and the perimeter network, said method comprising:
receiving instructions at the one or more domain controller computing devices from an administrator from within the trusted network instructing that one of the server computing devices requires disenfranchisement from communicating with the other server computing devices, wherein said receiving instructions includes receiving an indication that the server computing device requiring disenfranchisement poses a security risk; and
deleting credential information associated with the server computing device requiring disenfranchisement within the distributed directory service on the one or more domain controller computing devices based on the received instructions, wherein said deleting comprises deleting a configuration object associated with the server computing device within the distributed directory service, thereby eliminating the ability of any server computing device on the trusted network or the perimeter network to establish communication with the server with deleted credential information.

9. A method as set forth in claim 7 wherein said encrypting a replacement password comprises encrypting a replacement password including non-ASCII characters.

10. A method as set forth in claim 7 wherein said encrypting a replacement password comprises encrypting a replacement password including a maximum number of allowable characters.

11. A system for automatically updating credential information between a trusted server residing on a trusted network and an edge server residing on a perimeter network outside the trusted network, at least one server in the trusted network administering a distributed directory service, said system comprising:
a distributed directory service for storing information used to secure communication between the trusted servers of the trusted network and the edge server; and
one or more processors configured to execute computer-executable instructions for:
reading, by the trusted server, current credential information associated with the edge server residing on the perimeter network outside the trusted network, wherein the credential information includes a public key created by the edge server and a password created by the edge server, said public key and said password being associated with the edge server;
determining, by the trusted server, an expiration status of the current credential information associated with the edge server;
storing replacement credential information in an edge configuration object in the distributed directory service when a replacement criteria is met, said replacement credential information including a replacement password created by and associated with the edge server, said replacement password being encrypted;
propagating, by any trusted server in the trusted network, the replacement credential information stored in the edge configuration object from the distributed directory service to the edge server in the perimeter network, wherein said trusted server secures the authenticity of the replacement credential information by digitally signing the credential information with a private key created by and associated with said trusted server;
verifying, at the edge server, that the replacement credential information received from the propagating trusted server has been digitally signed by said propagating trusted server, whereby the replacement credential information is rejected when said verifying fails; and
utilizing, by the trusted server, the replacement credential information when an attempt to utilize the current credential information fails.

12. A system as set forth in claim 11, said one or more processors being further configured to execute computer-executable instructions for deleting the current credential information when an attempt to utilize the replacement credential information is successful.

13. A system as set forth in claim 11 wherein said storing replacement credential information comprises digitally signing, by each trusted server, the credential information of the particular trusted server with a private key created by the trusted server, said system further comprising verifying, at the edge server, that each particular trusted server has digitally signed its respective credentials.

14. A system as set forth in claim 11 wherein said propagating the replacement credential information occurs with any trusted server adapted for communication with the perimeter network.

15. A system as set forth in claim 11, said one or more processors being further configured to execute computer-executable instructions for:
disenfranchising a server computing device residing on the trusted network or the perimeter network from communication with other server computing devices on the trusted network or the perimeter network, said distributing directory service comprising credential information corresponding to each of the server computing devices on the trusted network and the perimeter network, said system comprising:
receiving instructions at the one or more domain controller computing devices from an administrator from within the trusted network instructing that one of the server computing devices requires disenfranchisement from communicating with the other server computing devices, wherein said receiving instructions includes receiving an indication that the server computing device requiring disenfranchisement poses a security risk; and
deleting credential information associated with the server computing device requiring disenfranchisement within the distributed directory service on the one or more domain controller computing devices based on the received instructions, wherein said deleting comprises deleting a configuration object associated with the server computing device within the distributed directory service, thereby eliminating the ability of any server computing device on the trusted network or the perimeter network to establish communication with the server with deleted credential information.

16. A system as set forth in claim 12 wherein said reading the current credential information comprises reading a password of the edge server; and
wherein said encrypting the replacement credential information comprises encrypting a replacement password.

17. A system as set forth in claim 14, said one or more processors being further configured to execute computer-executable instructions for:

disenfranchising a server computing device residing on the trusted network or the perimeter network from communication with other server computing devices on the trusted network or the perimeter network, said distributing directory service comprising credential information corresponding to each of the server computing devices on the trusted network and the perimeter network, said system comprising:

receiving instructions at the one or more domain controller computing devices from an administrator from within the trusted network instructing that one of the server computing devices requires disenfranchisement from communicating with the other server computing devices, wherein said receiving instructions includes receiving an indication that the server computing device requiring disenfranchisement poses a security risk; and deleting credential information associated with the server computing device requiring disenfranchisement within the distributed directory service on the one or more domain controller computing devices based on the received instructions, wherein said deleting comprises deleting a configuration object associated with the server computing device within the distributed directory service, thereby eliminating the ability of any server computing device on the trusted network or the perimeter network to establish communication with the server with deleted credential information.

18. A system as set forth in claim 16 wherein said encrypting a replacement password comprises encrypting a replacement password including non-ASCII characters.

19. A system as set forth in claim 16 wherein said encrypting a replacement password comprises encrypting a replacement password including a maximum number of allowable characters.

20. A method for disenfranchising a server computing device residing on a trusted network or a perimeter network from communication with other server computing devices on the trusted network or the perimeter network, said trusted network administering a distributed directory service on one or more domain controller computing devices, said distributing directory service comprising credential information corresponding to each of the server computing devices on the trusted network and the perimeter network, said method comprising:

receiving instructions at the one or more domain controller computing devices from an administrator from within the trusted network instructing that one of the server computing devices requires disenfranchisement from communicating with the other server computing devices, wherein said receiving instructions includes receiving an indication that the server computing device requiring disenfranchisement poses a security risk; and deleting credential information associated with the server computing device requiring disenfranchisement within the distributed directory service on the one or more domain controller computing devices based on the received instructions, wherein said deleting comprises deleting a configuration object associated with the server computing device within the distributed directory service, thereby eliminating the ability of any server computing device on the trusted network or the perimeter network to establish communication with the server with deleted credential information.

\* \* \* \* \*